United States Patent
Winzell et al.

(10) Patent No.: US 11,778,334 B2
(45) Date of Patent: Oct. 3, 2023

(54) METHOD AND A THERMAL CAMERA HAVING A MICROBOLOMETER DETECTOR FOR CAPTURING A SEQUENCE OF IMAGE FRAMES

(71) Applicant: Axis AB, Lund (SE)

(72) Inventors: Thomas Winzell, Lund (SE); Jesper Bengtsson, Lund (SE)

(73) Assignee: AXIS AB, Lund (SE)

( * ) Notice: Subject to any disclaimer, the term of this patent is extended or adjusted under 35 U.S.C. 154(b) by 63 days.

(21) Appl. No.: 17/710,134

(22) Filed: Mar. 31, 2022

(65) Prior Publication Data

US 2022/0353402 A1 Nov. 3, 2022

(30) Foreign Application Priority Data

Apr. 30, 2021 (EP) ..................................... 21171561

(51) Int. Cl.
| | |
|---|---|
| *H04N 23/73* | (2023.01) |
| *G06T 5/50* | (2006.01) |
| *G08B 21/18* | (2006.01) |
| *H04N 7/18* | (2006.01) |

(52) U.S. Cl.
CPC ............... *H04N 23/73* (2023.01); *G06T 5/50* (2013.01); *G08B 21/182* (2013.01); *H04N 7/18* (2013.01); *G06T 2207/10016* (2013.01); *G06T 2207/10048* (2013.01); *G06T 2207/10144* (2013.01);
(Continued)

(58) Field of Classification Search
None
See application file for complete search history.

(56) References Cited

U.S. PATENT DOCUMENTS

| | | | |
|---|---|---|---|
| 7,885,536 B1 | 2/2011 | Richards et al. | |
| 8,797,439 B1* | 8/2014 | Coley | H04N 23/45 348/222.1 |
| 2008/0231725 A1 | 9/2008 | Sakamoto et al. | |
| | (Continued) | | |

FOREIGN PATENT DOCUMENTS

| | | | |
|---|---|---|---|
| EP | 3301640 A1 | 4/2018 | |
| WO | WO-2014127376 A2 * | 8/2014 | ....... H01L 27/14654 |

OTHER PUBLICATIONS

Extended European Search Report dated Nov. 15, 2021 for European Patent Application No. 21171561.0.

*Primary Examiner* — James M Hannett
(74) *Attorney, Agent, or Firm* — Volpe Koenig

(57) ABSTRACT

There is provided a method for capturing a sequence of image frames in a thermal camera having a microbolometer detector comprising: capturing a first sequence and a second sequence of image frames with a shutter of the thermal camera being in a closed state and an open state, respectively. While capturing each of the first and the second sequence, an integration time of the microbolometer detector is switched between a plurality of integration times according to one or more repetitions of a temporal pattern of integration times. The method further comprises correcting image frames in the second sequence that are captured when the integration time is switched to a particular position within the temporal pattern of integration times using image frames in the first sequence that are captured when the integration time is switched to the same particular position within the temporal pattern of integration times.

20 Claims, 3 Drawing Sheets

(52) U.S. Cl.
CPC ............... *G06T 2207/20224* (2013.01); *G06T 2207/30232* (2013.01)

(56) References Cited

U.S. PATENT DOCUMENTS

| | | |
|---|---|---|
| 2011/0279706 A1 | 11/2011 | Lesiak et al. |
| 2013/0000828 A1 | 1/2013 | Liberman et al. |
| 2019/0208147 A1 | 7/2019 | Larson et al. |
| 2021/0197810 A1* | 7/2021 | LeBeau ................ H04N 23/698 |

* cited by examiner

METHOD AND A THERMAL CAMERA HAVING A MICROBOLOMETER DETECTOR FOR CAPTURING A SEQUENCE OF IMAGE FRAMES

FIELD OF INVENTION

The present invention relates to thermal cameras having a microbolometer detector. In particular, it relates to capturing a sequence of image frames using such a thermal camera.

TECHNICAL BACKGROUND

A thermal camera may use a microbolometer sensor, which is an uncooled sensor, to capture image frames. To compensate for imperfections in the sensor, it is common practice to subtract a shutter image from image frames captured by the image sensor. A shutter image is an image captured by the sensor when a shutter of the thermal camera is closed, i.e., when no radiation from the scene reaches the sensor, and it provides a measurement of non-homogeneous errors in the sensor. If there had been no imperfections in the sensor, the shutter image would have been a completely homogenous image. However, due to dark currents in the sensor, this is not the case and there will be differences between different pixels in the shutter image. Additionally, these differences vary with temperature since the dark currents are temperature dependent. Thus, as the temperature of the sensor starts to drift or when there are other thermal fluctuations in the sensor, a new shutter image is preferably captured. For example, a new shutter image may be captured every 10th minute or as a drift in temperature is detected.

In some situations it is desirable to expand the dynamic range of the thermal camera. That can be achieved by capturing image frames while cycling through different integration times. When cycling through different integration times, the heating of the microbolometer sensor will vary between frames and, as a consequence, also the dark currents. Accordingly, and as noted in U.S. Pat. No. 7,885, 536B1, dark current values changes with integration time, and therefore each integration time preferably has an associated shutter image.

However, the temperature variation of the microbolometer sensor between capturing image frames with different integration times does not only affect the dark currents, but also has the consequence of introducing a bias in the captured image frames. More specifically, when the microbolometer sensor is switched from capturing image frames with a first integration time to capturing image frames with a second integration time, it takes time for the temperature of the microbolometer to settle to a temperature level associated with the second integration time. This introduces a bias in the sensor read-out of the first frames captured after the switch to the second integration time. In order to have a dark current compensation which does not introduce further systematic errors in the captured image frames, that bias is preferably taken into account when generating the shutter images. There is thus room for improvements.

SUMMARY

In view of the above, it is thus an object of the present disclosure to mitigate the above problems. In particular, it is an object to correct for dark currents of a microbolometer sensor in a way that takes account of the sensor-readout bias introduced upon switching between different integration times.

The disclosure is defined by the independent claims, and various embodiments thereof are defined by the dependent claims.

In particular, the above object is achieved by a method for capturing a sequence of image frames in a thermal camera having a microbolometer detector, comprising:

capturing a first sequence of image frames with a shutter of the thermal camera being in a closed state and while switching an integration time of the microbolometer detector between a plurality of integration times according to one or more first repetitions of a temporal pattern of integration times, capturing a second sequence of image frames with the shutter of the thermal camera being in an open state and while switching the integration time of the microbolometer detector between the plurality of integration times according to one or more second repetitions of the same temporal pattern of integration times, and correcting image frames in the second sequence that are captured when the integration time is switched to a particular position within the temporal pattern of integration times using image frames in the first sequence that are captured when the integration time is switched to the same particular position within the temporal pattern of integration times.

The inventors have realized that it is advantageous to switch the integration time according to a repetitive temporal pattern which is the same when capturing the shutter image frames and the normal image frames. In that way, the bias in a normal image frame and in a shutter image frame having the same relative position within a repetition of the temporal pattern will be the same. Further, a normal image frame and the shutter images used for correction thereof correspond to the same relative position within a repetition of the temporal pattern. This implies that a normal image frame is not only corrected using shutter image frames captured with the same integration time as the normal image frame, but also having the same bias as that of the normal image frame. Accordingly, the dark current compensation will be more precise and not introduce a systematic error in the captured image frames.

According to a second aspect, the above object is achieved by a thermal camera, comprising a microbolometer detector, a shutter, a controller configured to control the microbolometer detector and the shutter to:

capture a first sequence of image frames with the shutter being in a closed state and while switching an integration time of the microbolometer detector between a plurality of integration times according to one or more first repetitions of a temporal pattern of integration times, and capture a second sequence of image frames with the shutter being in an open state and while switching the integration time of the microbolometer detector between the plurality of integration times according to one or more second repetitions of the same temporal pattern, and an image processor configured to correct image frames in the second sequence that are captured when the integration time is switched to a particular position within the temporal pattern of integration times using image frames in the first image sequence that are captured when the integration time is switched to the same particular position within the temporal pattern of integration times.

According to a third aspect, the above object is achieved by a non-transitory computer readable medium comprising computer code instructions adapted to cause a thermal camera having a microbolometer detector to carry out the method of the first aspect when executed by a device having processing capability The second and third aspects may generally have the same features and advantages as the first aspect. It is further noted that the disclosure relates to all possible combinations of features unless explicitly stated otherwise.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION

The present examples of the disclosure will now be described more fully hereinafter with reference to the accompanying drawings, in which embodiments of the invention are shown.

Figure 1:
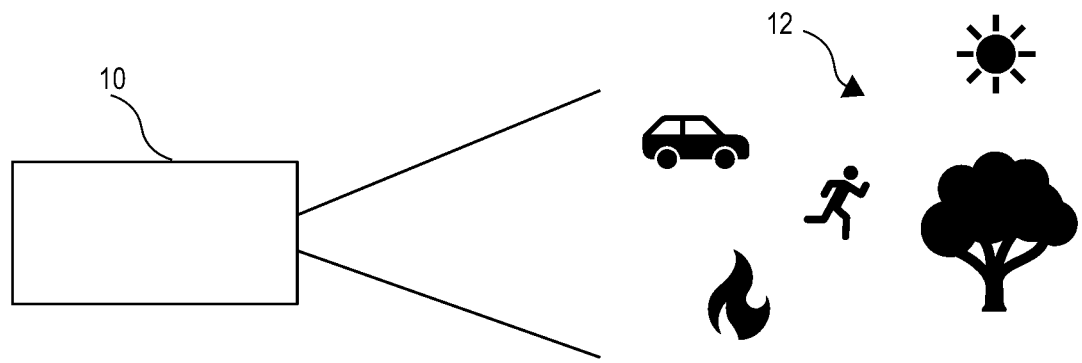
FIG. 1 schematically illustrates a thermal camera which is arranged to monitor a scene.

FIG. 1 illustrates a thermal camera 10 which is arranged to monitor a scene 12. The thermal camera 10 detects radiation in the infrared parts of the spectrum over time using a microbolometer detector and generates a sequence of image frames from the detected radiation. In the scene 12 there are objects of different temperatures which act as sources of infrared radiation. For example, as illustrated, there may be cars, persons, trees, and a fire. The temperature range spanned by these objects may be large which makes it difficult for the thermal camera 10 to properly image all objects using a single integration time of the microbolometer detector. By way of example, objects of a lower temperature, such as the persons or cars, may require a longer integration time than objects of a higher temperature, such as the fire. If the longer integration time is used, it would be possible to resolve temperature for the objects of lower temperature, but not for the objects of higher temperature since the microbolometer detector would saturate, and vice versa. To cover the full temperature range, the thermal camera 10 may instead have to operate with several different integration times which are optimal for different parts of the temperature range. For example, the thermal camera 10 may switch the integration time of the microbolometer detector between capturing subsequent image frames.

In some embodiments, the thermal camera 10 may combine subsequent image frames that are captured with different integration times into a single image frame to produce a high dynamic range image. In other embodiments, the thermal camera 10 extracts image frames having a first integration time from the sequence of image frames to produce a first video stream, and extracts image frames having a second, different, integration time from the sequence of image frames to produce a second video stream. In the latter case, the thermal camera will hence produce several separate video streams corresponding to different integration times. These separate video streams may be subject to different types or post-processing, such as different types of analytics including object detection, motion detection etc. For example, these separate video streams may advantageously be used to implement an early fire warning system. The integration time of the first stream may be selected such that it is suitable for detecting objects in a lower temperature range, such as a temperature range of human beings. The integration time of the second stream may be selected such that it is suitable for detecting objects in a higher temperature range, such as a temperature range which is suitable for detecting a newly lit fire (temperatures above 250° C.). The first video stream may then be used for monitoring human beings, such as carrying out analytics to detect human objects, estimate motion of human objects, and track human objects. The second stream may be used to monitor occurrence of fire. For example, the second stream may be monitored to issue an alarm when pixel values in the second video stream exceeds an alarm threshold.

Figure 2:
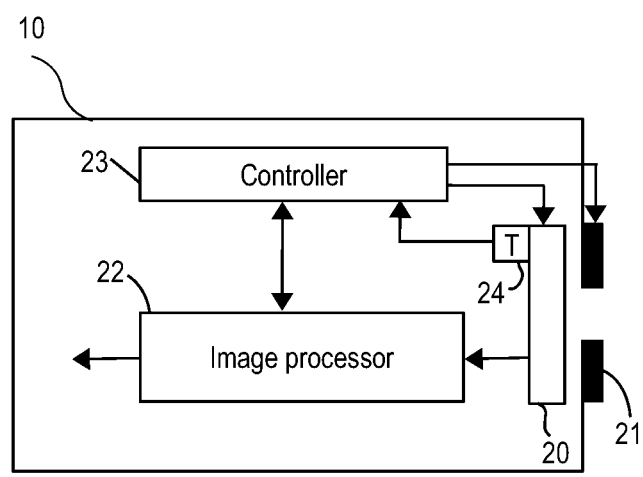
FIG. 2 schematically illustrates a thermal camera according to embodiments.

FIG. 2 illustrates the thermal camera 10 in more detail. It includes a microbolometer detector 20, a shutter 21, an image processor 22, and a controller 23. The microbolometer detector 20 may also be referred to as a microbolometer sensor 20. The microbolometer detector 20 may also include a temperature sensor 24 which measures the temperature of the microbolometer detector 20.

As is known in the art, a microbolometer detector 20, or microbolometer sensor, is arranged to detect infrared radiation from the scene 12. When generating an image frame, the microbolometer detector 20 integrates the detected infrared radiation over a time period referred to as an integration time. The integration time to use for each frame is set by the controller 23. In particular, the controller 23 may control the microbolometer detector 20 to switch between a plurality of integration times such that subsequent image frames have different integration times. The switching may follow a predefined temporal pattern which is repeated. A repetition of the temporal pattern may be seen as a sequence of integration times defining which integration time should be used for a number of subsequent image frames. Generally, the temporal pattern of integration times may be said to indicate how often and in which order to switch between the plurality of integration times. This is further illustrated in FIG. 3 which shows a sequence of image frames I1-I14 captured using the microbolometer detector 20. While capturing the image frames I1-I14, the microbolometer detector 20 is controlled to switch the integration time according to a plurality of repetitions R1-R7 of a temporal pattern of integration times. The temporal pattern is the same in each repetition R1-R7. The plurality of repetitions R1-R7 of the temporal pattern may hence be said to form a repetitive temporal pattern. In this example, the plurality of integration times includes two integration times T1 and T2 and each repetition of the temporal pattern is given by T1 followed by T2, i.e., by the sequence {T1, T2} of integration times. The integration time T1 is located at a first position within the temporal pattern, i.e., is first in order within the sequence of integration times, and the integration time T2 is located at a second position within the temporal pattern, i.e., is second in order within the sequence of integration times. As used herein, a position within the temporal pattern of integration times hence refers to a sequential position within the sequence of integration times defined by a repetition of the temporal pattern.

Figure 3:
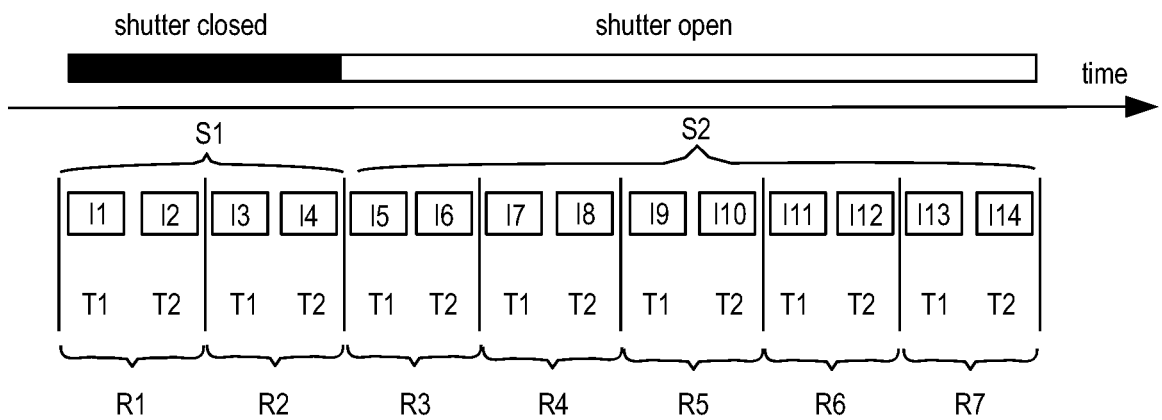
FIG. 3 and FIG. 4 schematically illustrate a first and a second sequence of image frames captured when a shutter of the thermal camera is in a closed position and in an open position, respectively, according to embodiments.
Figure 4:
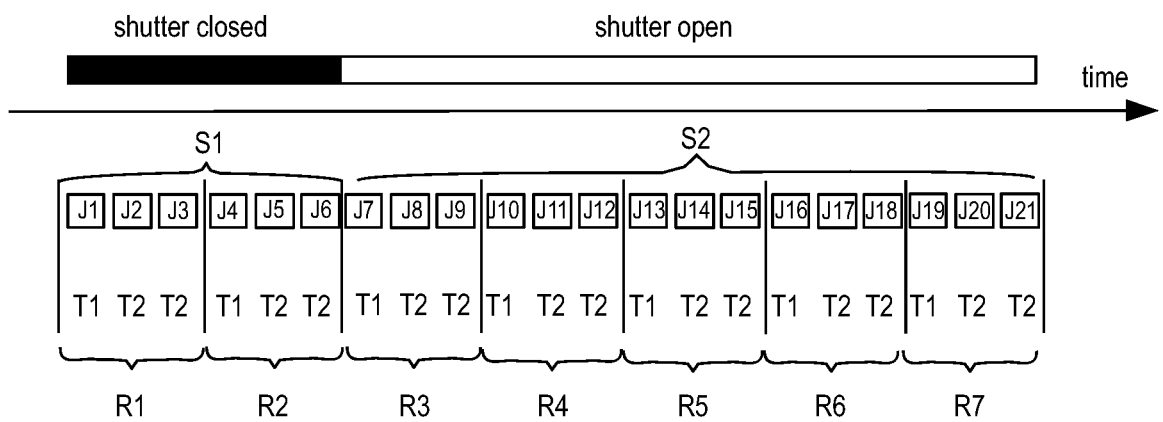

In the example of FIG. 3, the temporal pattern indicates that each integration time T1 and T2 is to be switched to every second frame. This example may be generalized to the situation where there are n≥2 integration times. Specifically, there may be n integration times and the temporal pattern may indicate that each integration time is to be switched to every n:th frame. In the above examples, the temporal pattern indicates that the integration time of the microbolometer detector is to be switched between every image frame. However, it is also possible that the temporal pattern indicates that one of more of the plurality of integration times is to be repeated for more than one frame in a row. For example, in case of two integration times, a repetition of the temporal pattern could be {T1, T2, T2}, as illustrated in FIG. 4. In that case, integration time T1 is located at the first position within the temporal pattern, and the integration time T2 is located at the second and third position within the temporal pattern. Another example of a temporal pattern with two integration times is {T1, T1, T2, T2}. As the skilled person realizes, a repetitive temporal pattern could be formed from a plurality of integration times in many ways and the above given examples are just some out of many possible temporal patterns.

When switching between different integration times, different levels of current are driven through the pixels of the microbolometer detector 20. A longer integration time gives rise to a higher current than a shorter integration time. These different currents have an impact on the temperature of the microbolometer detector 20, and will in the end affect the signal out of the microbolometer detector 20. For example, when switching from T1 to T2, where T1>T2, the higher current during T1 will give microbolometer 20 a higher temperature than it would have if the integration time had instead been T2 prior to the switch. As a result, the signal output of the following frame will be higher than it should have been. In other words, the switching introduces a bias in the following image frame captured with integration time. The same applies when switching back from T2 to T1 again, although in that case the bias is in the negative direction resulting in a lower signal output than it should. This bias will reduce with time if several frames in a row are captured with the same integration time, since the temperature of the microbolometer detector 20 will settle with time. This will, for example be the case in the example of FIG. 4 where two image frames in a row are captured using integration time T2. In that case, one should note that the bias will be different for the subsequent image frames captured with the same integration time T2. Specifically, the first image frame captured after the switching from T1 to T2 will have a larger bias than the second image frame captured after the switching. However, one should also note that the bias will be the same for two image frames having the same position within a repetition of the temporal pattern. For example, image frames I2, I4, I6, I8, I10, I12, and I14 in FIG. 3 will be associated with a first bias, while image frames I1, I3, I5, I7, I9, I11, I13 are associated with a second, different, bias. Similarly, in FIG. 4, image frames J1, J4, J7, J10, J13, J16, J19 will have a first bias, image frames J2, J5, J8, J11, J14, J17, J20 will have a second, and image frames J3, J6, J9, J12, J15, J18, J21 will have a third bias. Embodiments described herein makes use of this fact to cancel out the bias when performing correction of image frames.

The controller 23 may further control the shutter 21 to be in an open or in a closed state. In particular, it may control the shutter 21 to be in a closed state during one or more first repetitions R1-R2 of the temporal pattern of integration times, and in an open state during other one or more second repetitions R3-R7 of the temporal pattern. In contrast to the open state, no radiation from the scene 12 enters the thermal camera 10 to reach the microbolometer detector 20 when the shutter 21 is in the closed state. Images captured when the shutter is in a closed state are sometimes referred to as shutter images since they depict the closed shutter 21 rather than the scene 12. Other names are flat field correction images and non-uniform correction images. If there were no imperfections in the microbolometer detector 20, the shutter images would be completely uniform, i.e., have the same pixel value in all pixels. However, in reality they will not be uniform due to imperfections in the microbolometer detector 20 known as dark currents. The role of the shutter images is to measure these imperfections such that they may be cancelled out from the image frames captured when the shutter 21 is in an open state.

As used herein, the one or more first repetitions of the temporal pattern of integration times refer to one or more subsequent repetitions of the temporal pattern. Likewise, one or more second repetitions of the temporal pattern refer to one or more subsequent repetitions of the temporal pattern. This is illustrated in FIG. 3 where the shutter is in a closed state during repetitions R1-R2 of the temporal pattern in an open state during repetitions R3-R7 of the temporal pattern. The image frames I1-I4 captured while the shutter is in the closed state form a first sequence S1 of image frames, and the image frames I5-I14 captured while the shutter is in the open state form a second sequence S2 of image frames. The first and the second sequence may be seen as a first and a second subsequence of a sequence of image frames captured by the thermal camera 10.

It is understood that the number of first repetitions and the number of second repetitions are not limited to the ones illustrated in FIG. 3, but may be varied in different embodiments. However, the one or more first repetitions of the temporal pattern of integration times beneficially include fewer repetitions than the one or more second repetitions of the temporal pattern of integration times. In that way, most of the captured images will be useful images depicting the scene rather than the closed shutter. Still, it may be beneficial to include more than one repetition of the temporal pattern in the first repetitions in order to have the opportunity to average out random noise in the images captured while the shutter is closed.

The thermal camera 10 thus comprises an image processor 22 and a controller 23 are configured to implement various functionality of the thermal camera. Generally, the thermal camera may comprise circuitry which is configured to implement the controller 23 and the image processor 22 and, more specifically, their functionality.

In a hardware implementation, the image processor 22 and the controller 23 may correspond to circuitry which is dedicated and specifically designed to provide the functionality of the respective component. The circuitry may be in the form of one or more integrated circuits, such as one or more application specific integrated circuits or one or more field-programmable gate arrays. By way of example, the controller 23 may comprise circuitry which, when in use, causes the thermal camera 10 to capture first and second sequences of image frames while switching an integration time of the microbolometer detector 20 and having the shutter 21 in a closed and an open state, respectively. Similarly, the image processor 22 may comprise circuitry which, when in use, causes correction of image frames in the second sequence using image frames in the first sequence. For example, the image processor 22 may form part of an image processing pipeline of the thermal camera 10.

In a software implementation, the circuitry may instead be in the form of a processor, such as a microprocessor, which in association with computer code instructions stored on a (non-transitory) computer-readable medium, such as a non-volatile memory, causes the device 104 to carry out any method disclosed herein. Examples of non-volatile memory include read-only memory, flash memory, ferroelectric RAM, magnetic computer storage devices, optical discs, and the like. In a software case, the controller 22 and the image processor may thus each correspond to a portion of computer code instructions stored on the computer-readable medium, that, when executed by the processor, causes the device thermal camera 10 to carry out the functionality of the component.

It is to be understood that it is also possible to have a combination of a hardware and a software implementation, meaning that the functionality of one of the controller 23 or the image processor 22 is implemented in hardware and the other in software.

Figure 6:
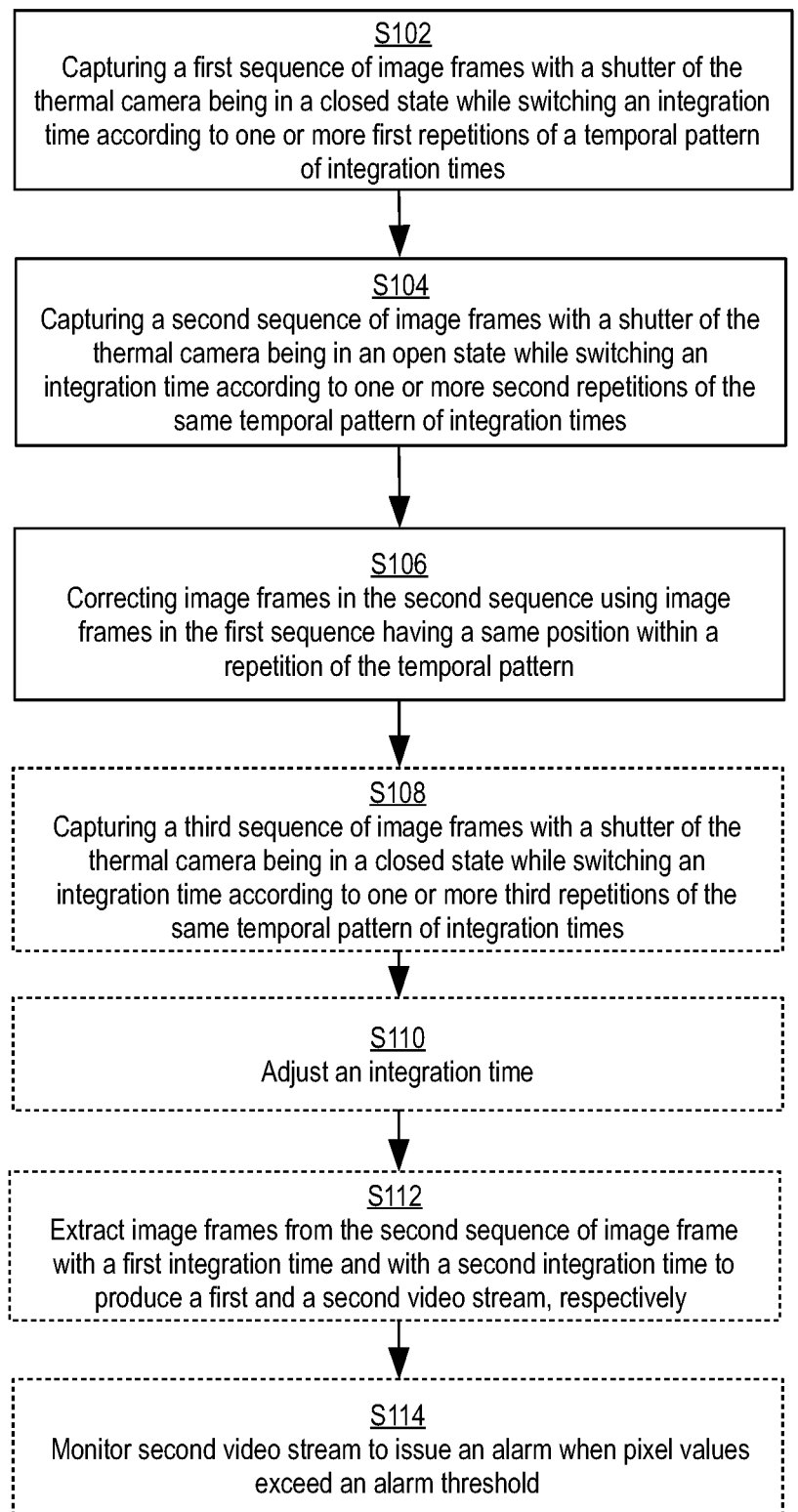
FIG. 6 is a flowchart of a method for capturing a sequence of image frames in a thermal camera having a microbolometer detector according to embodiments.

A method for capturing a sequence of image frames in a thermal camera 10 having a microbolometer detector 20 will now be described with reference to FIGS. 2-4, and the flow chart of FIG. 6. Method steps of an optional character are indicated by dashed lines in FIG. 6.

In step S102, the thermal camera 10 captures a first sequence S1 of image frames I1-I4 while switching an integration time of the microbolometer detector 20 between a plurality of integration times I1, I2 according to one or more first repetitions R1-R2 of a temporal pattern of integration times. In more detail, the controller 23 of thermal camera 10 jointly controls the microbolometer detector 20 and the shutter 21 to capture the first image sequence S1.

In step S104 the thermal camera 10 captures a second sequence S2 of image frames I5-I14 while switching an integration time of the microbolometer detector 20 between a plurality of integration times I1, I2 according to one or more second repetitions R3-R7 of the same temporal pattern.

As illustrated in FIG. 3, the second sequence S2 of image frames may be captured after the first sequence S1 of image frames. This is advantageous in that the shutter images in the first sequence S1, which are used to correct the images in the second sequence S2, are already available when the images in the second sequence S2 are captured. Thus, the images in the second sequence S2 can be corrected immediately without having to await the shutter images to be captured. However, embodiments where the first sequence S1 is captured after the second sequence S2 may also be envisaged.

Upon being captured, the image frames of the first sequence S1 and the second sequence S2 are input to the image processor 22. The image processor 22 corrects image frames I5-I14 in the second sequence S2 using the image frames in the first sequence S1. The correction is made to reduce the impact of dark currents in the microbolometer detector 20 which otherwise may lead to some pixels having misleading pixel values. In more detail, in step S106, the image processor 22 corrects the image frames in the second sequence S2 that are captured when the integration time is switched to a particular position within the temporal pattern of integration times using image frames in the first sequence S1 that are captured when the integration time is switched to the same particular position within the temporal pattern of integration times.

Referring again to FIG. 3, the temporal pattern of integration times corresponds to the sequence {T1, T2} of integration times, where T1 is located at the first position in the temporal pattern and T2 is located at the second position in the temporal pattern. Image frames I5, I7, I9, I11 and I13 in the second sequence S2 are all captured when the integration time is switched to the first position in the temporal pattern. Similarly, image frames I1, I3 in the first sequence S1 are captured when the integration time is switched to the first position in the temporal pattern. In this example, the image processor 22 will hence correct image frames I5, I7, I9, I11 and I13 in the second sequence S2 using image frames I1, I3 in the first sequence S1. In the same way, the image processor 22 will correct image frames I6, I8, I10, I12, and I14 in the second sequence S2 using image frames I2 and I4 in the first sequence S1. Notably, image frames I5, I7, I9, I11 and I13, and the image frames I1, I3 used for their correction have the same position within a repetition of the temporal pattern. The same holds for image frames I6, I8, I10, I12, and I14 and image frames I2, I4 used for the correction thereof.

FIG. 4 illustrates another example where the temporal pattern of integration times corresponds to the sequence {T1, T2, T2} of integration times where T1 is located at the first position in the temporal pattern and T2 is located at the second position and at the third position in the temporal pattern. In this case, the image frames J7, J10 J13, J16, J19 in the second sequence S2 are captured when the integration time is switched to the first position in the temporal pattern are therefore corrected using image frames J1, J4 in the first sequence S1. Image frames J8, J11, J14, J17, J20 in the second sequence S2 are captured when the integration time is switched to the second position in the temporal pattern and are therefore corrected using image frames J2, J5 in the first sequence S1. Image frames J9, J12, J15, J18, J21 in the second sequence S2 are captured when the integration time is switched to the second position in the temporal pattern and are therefore corrected using image frames J3, J6 in the first sequence S1.

The image frames in the second sequence S2 are hence not only corrected using image frames in the second sequence S1 having the same integration time, but the integration time also has the same position within the temporal pattern of integration times. Since they have the same position within the temporal pattern of integration times, the image frames to be corrected and the image frames used for the correction are associated with the same bias. This makes it possible to cancel out the bias when performing the correction.

In order to perform the correction an image frame in the second sequence 22, the image processor 22 may first form an average over the image frames in the first image sequence S1 that are used for the correction. The image processor 22 may calculate and temporarily store this average once it has received the image frames of the first sequence S1. In that way, it is available to the image processor 22 for usage when the image frames of second sequence 22 are captured. In particular, the image frames in the second sequence S2 that are captured when the integration time is switched to a particular position within the temporal pattern of integration times may be corrected by using an average of the image frames in the first image sequence S1 that are captured when the integration time is switched to the same particular position within the temporal pattern of integration times. The average is typically a pixelwise average and the correction may be made by subtracting the pixelwise average from the image frames in the second sequence S2. By averaging, the sensitivity to measurement noise is reduced. Further, by making the subtraction, the bias described above is cancelled out. By way of example, the image processor 22 may form a first pixelwise average of image frames I1 and I3, and a second pixelwise average of image frames I2 and I4. The image processor 22 may then subtract the so formed averages from the image frames from the image frames in the second sequence S2 to carry out the correction. In the FIG. 3 example, the image processor 22 would hence subtract the pixelwise average of frames I1 and I3 from each of image frames I5, I7, I9, I11, and I13. Likewise, the image processor 22 would subtract the pixelwise average of frames I2 and I4 from each of image frames I6, I8, I10, I12, and I14.

The subtraction of the pixelwise average from the image frames in the second sequence S2 may affect the overall signal level in the image frames in the second sequence S2. In order to maintain the overall signal level, one may add, to the image frames in the second sequence S2 a total average of the concerned shutter images from the first sequence S1. By a total average is meant an average over all pixels in all the concerned shutter images. To exemplify, the image processor 21 may form a first total average by averaging all pixel values in frames I1 and I3 and add that first total average value to the image frames I5, I7, I9, I11 and I13. Similarly, the image processor 22 may form a second total average by averaging all pixel values in frames I2 and I4 and add that second total average value to the image frames I6, I8, I10 and I12 and I14. Similarly, to what said above about the pixelwise averages, the image processor 22 may calculate and temporarily store these total averages once it has received the image frames of the first sequence S1. As an alternative, instead of first subtracting pixelwise averages and then adding total averages of shutter images, the image processor 22 may combine the pixelwise average and the total average beforehand into a correction image, e.g., by subtracting the total average from the pixelwise average. The correction image may then be used to correct the image frames in the second sequence S2 in one operation, e.g., by subtracting the correction image from the image frame in the second sequence S2.

Figure 5:
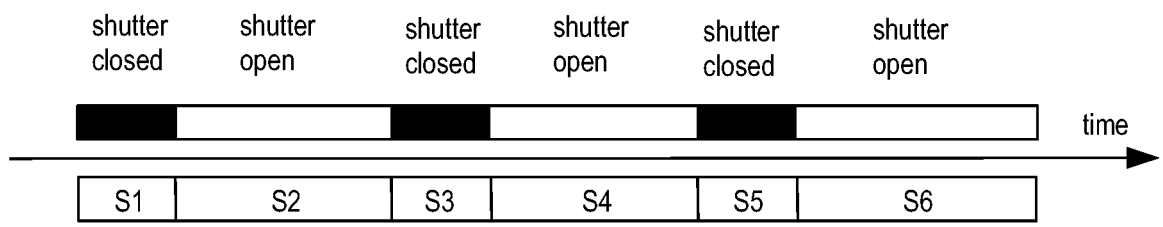
FIG. 5 illustrates six sequences of image frames captured when a shutter of the thermal camera interchangeably is in a closed position and in an open position according to embodiments.

As described above, the image processor 22 uses the shutter images of the first image sequence S1 to correct the image frames in the second sequence S2. However, from time to time, the thermal camera 10 preferably captures a new sequence of shutter images. Therefore, the controller 23 may in some embodiments, in step S108, control the microbolometer detector 20 and the shutter 21 to capture a third sequence of image frames with the shutter 21 of the thermal camera 10 being in a closed state and while switching an integration time of the microbolometer detector 20 between the plurality of integration times according to one or more third repetitions of the same temporal pattern of integration times. The third sequence of image frames may be captured after the second sequence S2 of image frames. The third sequence of image frames may be used to correct image frames captured after the capturing of the third sequence of image frames. This is further illustrated in FIG. 5 which shows a third sequence of image frames S3 which is captured after the second sequence of image frames S2 when the shutter is in a closed state, and a fourth sequence of image frames S4 which is captured after the third sequence S3 with the shutter being in an open state. In analogy to what has been described above, the image frames of the third sequence S3 may be used to correct image frames in the fourth sequence S4. As shown in FIG. 5, this procedure is typically repeated such that the thermal camera 10 keeps capturing sequences of image frames with the shutter interchangeably being in a closed and in an open state.

A reason for capturing new shutter images from time to time is that the dark currents in the microbolometer detector 20 increase with sensor temperature. If there has been a considerable drift in sensor temperature since the last time shutter images were captured, the shutter images therefore become outdated and new shutter images are preferably captured. Different strategies may be used for triggering the capture of new shutter images. One simple strategy is to capture new shutter images when a predetermined amount of time has passed since the capturing of the previous shutter images. Thus, the capturing of the third sequence S3 may be triggered by a predetermined amount of time having passed since the capturing of the first sequence of image frames. By way of example, new shutter images may be captured every tenth minutes. Another, more refined, strategy is to capture new shutter images when it is found that temperature of the microbolometer detector 20 has drifted by more than a certain value since the last time shutter images were captured. Thus, the capturing the third sequence S3 may be triggered by the temperature of the microbolometer detector having changed by more than a temperature threshold since the capturing of the first sequence of image frames. By way of example, the temperature threshold may be set to 0.2° C. However, the value to use for the temperature threshold may depend on the sensitivity of the microbolometer detector 20 and which type of camera module is used. In order to implement this strategy, the controller 23 can make use of the temperature sensor 24 of the microbolometer detector 20. In particular, it can monitor the temperature of the microbolometer detector 20 and trigger the capturing of the new sequence S3 of shutter images when the temperature of the detector 20 has drifted by more than the temperature threshold since the capturing of the preview sequence S1 of shutter images. For example, it can use the temperature of the microbolometer detector 20 when capturing the first image frame I1 of the previous sequence S1 as a reference for its comparisons. The temperature threshold may be predetermined value. Alternatively, the temperature threshold may vary with an ambient temperature of the thermal camera according to a predefined relation. For example, the predefined relation may specify to use a lower temperature threshold for lower ambient temperatures than for higher ambient temperatures. A reason for varying the temperature threshold with the ambient temperature is that the sensitivity of the microbolometer detector 20 varies with the ambient temperature. The temperature sensor 24 of the microbolometer detector 20 may be used to give an estimate of ambient temperature of the camera since the temperature of the detector 20 in essence reflects the ambient temperature.

In the above, the integration times among the plurality of integration times are assumed to be fixed throughout the first sequence S1 and the second sequence S1. However, similar to the exposure time of a visual light camera, the integration time has to be adjusted from time to time to give an appropriate exposure in the image frames produced by the thermal camera 10. The control unit 23 may therefore adjust, in step S110, an integration time among the plurality of integration times. The adjustment may be made in response to detecting a change in ambient temperature of the thermal camera 10. For example, the adjustment may be made if the ambient temperature of the thermal camera 10 has changed by more than a second temperature threshold since the integration times were last adjusted. Again, the temperature sensor 24 of the thermal camera 10 may be used to estimate the ambient temperature. The adjustment may also be made in response to detecting that a number or saturated or black pixels in an image frame of the second sequence S2 exceeds a saturation threshold. In that case, the image frame is not correctly exposed, and the integration time used when capturing that image is preferably adjusted.

Since the dark current values in the microbolometer detector 20 change with integration time, it is preferred to trigger the capturing of a new shutter image sequence after adjustment of the integration time. Therefore, according to yet another strategy, the capturing of the third sequence S3 may be triggered by an adjustment of at least one integration time among the plurality of integration times.

It is understood that the above strategies for triggering the capturing of a new shutter image sequence may be combined. For example, as a basic rule, a new shutter image sequence may be triggered once a predetermined amount of time has passed. However, it may be triggered earlier than that if the temperature of the microbolometer detector 20 has changed by more than a temperature threshold since the last shutter image sequence, or following an adjustment of one or more of the integration time values.

After performing the correction, the image processor 22 may proceed to produce two or more video streams from the images captured while the shutter 21 of the camera 10 is in an open state. In particular, in step S112, the image processor 22 may extract image frames having a first integration time from the second sequence S2 of image frames to produce a first video stream, and extract image frames having a second integration time which is shorter than the first integration time from the second sequence of image frames to produce a second video stream. It is understood that this generalizes such that one video stream is formed for each integration time. It is further understood that this is not limited to extracting image frames from the second sequence S2, but to any subsequent sequence S4, S6, etc. captured while the shutter 21 is open. The video streams corresponding to different integration times may advantageously be subject to different types or post-processing, such as different types of analytics including object detection, motion detection etc. In one example, the image processing unit 22 may in step S114 monitor one of the video streams, such as the second video stream, to issue an alarm when pixel values in the video stream exceeds an alarm threshold. As further described above, this may advantageously be used to implement an early fire warning system.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for capturing a sequence of image frames in a thermal camera having a microbolometer detector, comprising:

capturing a first sequence of image frames with a shutter of the thermal camera being in a closed state and while switching an integration time of the microbolometer detector between a plurality of integration times according to one or more first repetitions of a temporal pattern of integration times, capturing a second sequence of image frames with the shutter of the thermal camera being in an open state and while switching the integration time of the microbolometer detector between the plurality of integration times according to one or more second repetitions of the same temporal pattern of integration times, and correcting, by subtraction, image frames in the second sequence that are captured when the integration time is switched to a particular position within the temporal pattern of integration times using image frames in the first sequence that are captured when the integration time is switched to the same particular position within the temporal pattern of integration times.

2. The method of claim 1, wherein the temporal pattern of integration times indicates how often and in which order to switch between the plurality of integration times.

3. The method of claim 1, wherein the temporal pattern indicates that the integration time of the microbolometer detector is to be switched between every image frame.

4. The method of claim 1, wherein there are n integration times and the temporal pattern indicates that each integration time is to be switched to every n:th image frame.

5. The method of claim 1, wherein image frames in the second sequence that are captured when the integration time is switched to a particular position within the temporal pattern of integration times are corrected by subtracting an average of the image frames in the first image sequence that are captured when the integration time is switched to the same particular position within the temporal pattern of integration times.

6. The method of claim 1, further comprising:
after capturing the second sequence of image frames, capturing a third sequence of image frames with the shutter of the thermal camera being in a closed state and while switching an integration time of the microbolometer detector between the plurality of integration times according to one or more third repetitions of the same temporal pattern of integration times
wherein the capturing of the third sequence is triggered by at least one of:
a temperature of the microbolometer detector having changed by more than a temperature threshold since the capturing of the first sequence of image frames,
a predetermined amount of time having passed since the capturing of the first sequence of image frames, and
an adjustment of at least one integration time among the plurality of integration times.

7. The method of claim 6, wherein the third sequence of image frames is used to correct image frames captured after the capturing of the third sequence of image frames.

8. The method of claim 6, wherein the temperature threshold varies with an ambient temperature of the thermal camera according to a predefined relation.

9. The method of claim 1, further comprising:
adjusting an integration time among the plurality of integration times in response to detecting a change in an ambient temperature of the thermal camera or in response to detecting that a number of saturated or black pixels in an image frame of the second sequence exceeds a saturation threshold.

10. The method of claim 1, wherein the second sequence of image frames is captured after the first sequence of image frames.

11. The method of claim 1, wherein the one or more first repetitions of the temporal pattern of integration times include fewer repetitions than the one or more second repetitions of the temporal pattern of integration times.

12. The method of claim 1, further comprising:
extracting image frames having a first integration time from the second sequence of image frames to produce a first video stream,
extracting image frames having a second integration time which is shorter than the first integration time from the second sequence of image frames to produce a second video stream.

13. The method of claim 12, comprising:
monitoring the second video stream to issue an alarm when pixel values in the second video stream exceed an alarm threshold.

14. A thermal camera, comprising:
a microbolometer detector,
a shutter,
a controller configured to control the microbolometer detector and the shutter to:
capture a first sequence of image frames with the shutter being in a closed state and while switching an integration time of the microbolometer detector between a plurality of integration times according to one or more first repetitions of a temporal pattern of integration times, and
capture a second sequence of image frames with the shutter being in an open state and while switching the integration time of the microbolometer detector between the plurality of integration times according to one or more second repetitions of the same temporal pattern, and
an image processor configured to correct, by subtraction, image frames in the second sequence that are captured when the integration time is switched to a particular position within the temporal pattern of integration times using image frames in the first image sequence that are captured when the integration time is switched to the same particular position within the temporal pattern of integration times.

15. A non-transitory computer readable medium comprising computer code instructions which when executed by a processor configure the processor cause a thermal camera having a microbolometer detector to:
capture a first sequence of image frames with a shutter of the thermal camera being in a closed state and while switching an integration time of the microbolometer detector between a plurality of integration times according to one or more first repetitions of a temporal pattern of integration times,
capture a second sequence of image frames with the shutter of the thermal camera being in an open state and while switching the integration time of the microbolometer detector between the plurality of integration times according to one or more second repetitions of the same temporal pattern of integration times, and
correct, by subtraction, image frames in the second sequence that are captured when the integration time is switched to a particular position within the temporal pattern of integration times using image frames in the first sequence that are captured when the integration time is switched to the same particular position within the temporal pattern of integration times.

16. The non-transitory computer readable medium of claim 15 wherein the temporal pattern of integration times indicates how often and in which order to switch between the plurality of integration times.

17. The non-transitory computer readable medium of claim 15, wherein the temporal pattern indicates that the integration time of the microbolometer detector is to be switched between every image frame.

18. The non-transitory computer readable medium of claim 15, wherein there are n integration times and the temporal pattern indicates that each integration time is to be switched to every n:th image frame.

19. The non-transitory computer readable medium of claim 15, wherein image frames in the second sequence that are captured when the integration time is switched to a particular position within the temporal pattern of integration times are corrected by subtracting an average of the image frames in the first image sequence that are captured when the integration time is switched to the same particular position within the temporal pattern of integration times.

20. The non-transitory computer readable medium of claim 15 wherein the processor is further configured to:
after capturing the second sequence of image frames, capture a third sequence of image frames with the shutter of the thermal camera being in a closed state and while switching an integration time of the microbolometer detector between the plurality of integration times according to one or more third repetitions of the same temporal pattern of integration times;
wherein the capturing of the third sequence is triggered by at least one of:
a temperature of the microbolometer detector having changed by more than a temperature threshold since the capturing of the first sequence of image frames,
a predetermined amount of time having passed since the capturing of the first sequence of image frames, and an adjustment of at least one integration time among the plurality of integration times.

* * * * *